Figure 2:
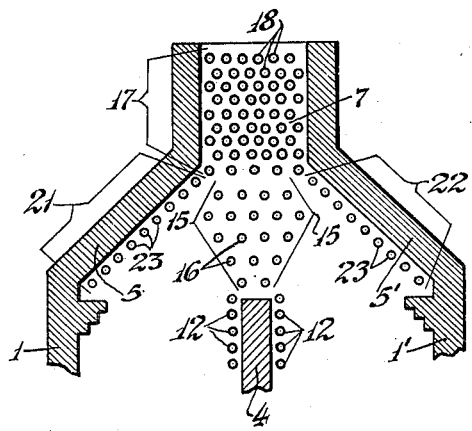

March 10, 1942. W. C. HENSEL 2,275,432
HEATING OF FLUIDS
Filed Jan. 18, 1940  3 Sheets-Sheet 1

Inventor:
Walter C. Hensel
By Lee J. Gary
Attorney

March 10, 1942.  W. C. HENSEL  2,275,432
HEATING OF FLUIDS
Filed Jan. 18, 1940  3 Sheets-Sheet 2

Inventor:
Walter C. Hensel
By Lee J. Gary
Attorney.

March 10, 1942.    W. C. HENSEL    2,275,432
HEATING OF FLUIDS
Filed Jan. 18, 1940    3 Sheets-Sheet 3
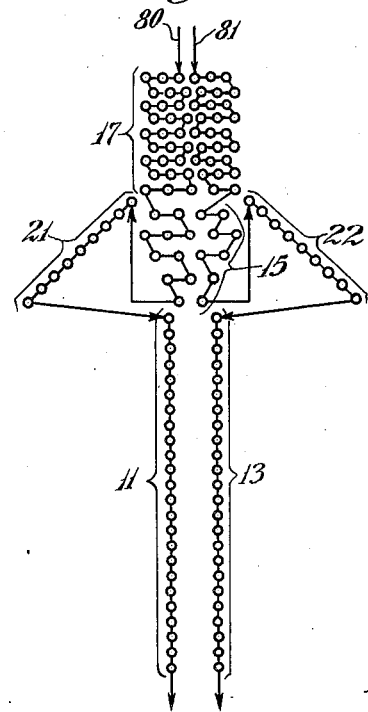
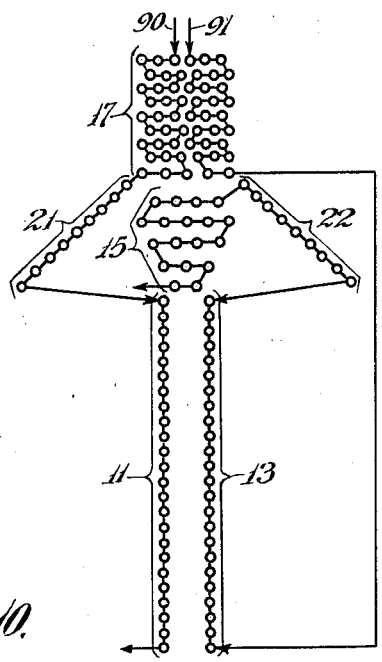
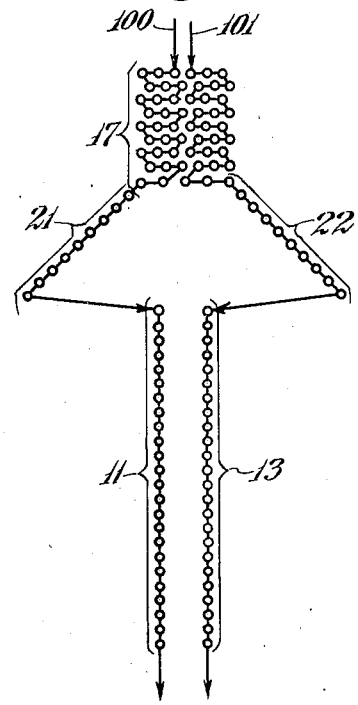
Inventor:
Walter C. Hensel
By Lee J. Gary
Attorney.

Patented Mar. 10, 1942

2,275,432

UNITED STATES PATENT OFFICE 2,275,432

HEATING OF FLUIDS

Walter C. Hensel, Chicago, Ill., assignor to Universal Oil Products Company, Chicago, Ill., a corporation of Delaware Application January 18, 1940, Serial No. 314,376

2 Claims. (Cl. 122—356)

The invention relates to an improved form of heater of the type employing high rates of heat transfer to fluid undergoing treatment therein and which is particularly well adapted to the heating of hydrocarbon oils to the high temperatures required for their pyrolytic conversion.

This heater employs a substantially vertical refractory wall disposed centrally between refractory side walls and dividing the space within the lower portion of the heater into separate combustion zones. One or a plurality of substantially vertical rows of horizontally disposed tubes, comprising a portion of the fluid conduit, are disposed adjacent each side of the central wall and receive heat at a high rate of radiation from the refractory side walls and from flames and hot combustion gases passing through the combustion and heating zones. The heater is fired in a generally upward direction in such a manner that the flames and hot combustion gases impinge upon and pass over the refractory side walls, heating the same to a highly radiant condition.

The refractory side walls of the heater slope inward, starting at a point approximately corresponding in elevation to the upper end of the central wall, and terminating in substantially vertical walls defining a fluid heating zone disposed above and spaced from said central wall.

The combustion gases from each of the separate combustion and heating zones commingle above the central wall of the heater and pass upwardly through the fluid heating zone to the flue or stack. The tubes disposed on opposite sides of the central wall extract a large portion of the radiant heat from the combustion gases in said combustion and heating zones and residual radiant heat is recovered from the commingled gases by another portion of the fluid conduit comprising tubes disposed between the upper end of the central wall and the fluid heating zone or adjacent the sloping portion of the side walls, or both. In passing through the fluid heating zone, the gases supply heat to another portion of the fluid conduit comprising a bank of tubular elements disposed in this zone. The gases pass in direct contact with the tubular elements of the bank in the fluid heating zone and are thereby appreciably further cooled prior to their discharge from the heater.

No novelty is claimed herein for this general form of heater except in combination with the arrangement of the tubular elements provided. By locating the tubular elements disposed within the combustion and heating zones adjacent the central wall instead of adjacent the outer walls of the heater, the danger of damage to the refractories of the central wall from overheating is largely eliminated and permits the use of a cheaper and less massive construction for this wall with safety. It obviates the use of an air-cooled central wall and thus permits the use of standard fire-brick shapes for its construction instead of the more expensive suspended shapes and obviates the necessity of a supporting steel structure for the central wall refractories. Firing against the outside walls, rather than the center wall, permits the use of additional tubular elements within the space defined by the sloping side walls, the upper end of the central wall and the tube bank in the fluid heating zone without the danger of flame impingement against these tubes and consequent overheating thereof.

The fluid conduit arrangement herein provided also facilitates a greater flexibility of flow through the fluid conduit so that practically any form of heating curve may be obtained. The highest rates of heating employed are obtained in the tubes disposed on opposite sides of the central wall, somewhat lower rates will prevail in the tubes disposed between the central wall and the fluid heating zone and still lower rates will prevail in the tubes disposed within the fluid heating zone. Thus, by varying the sequence of flow through the three tube banks a wide variation may be obtained in the heating curve. In addition to the advantages resulting from the arrangement of fluid conduits provided by the invention, all of the inherent advantages of this general form of heater with the fluid conduits arranged in conventional form are retained.

Figure 1:
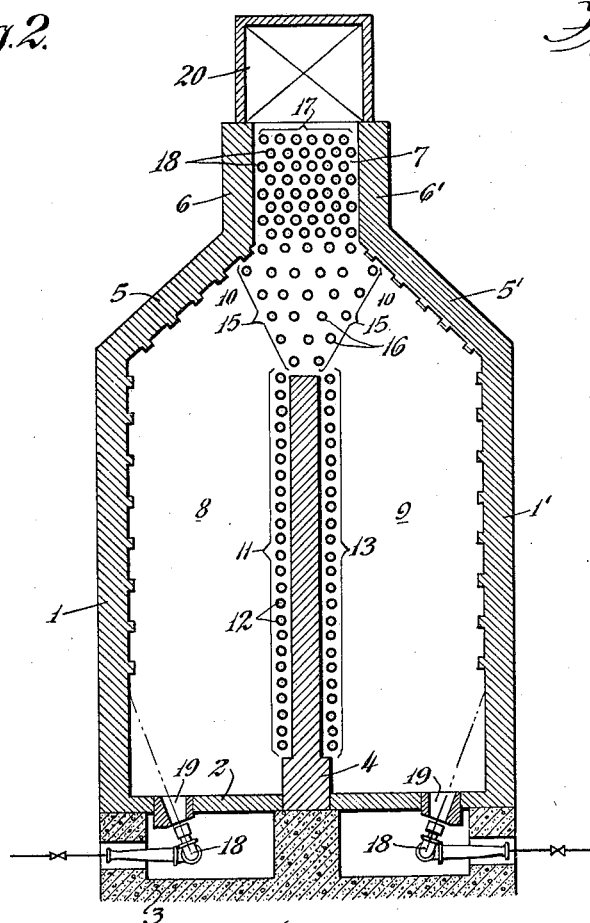

In the accompanying drawings, Fig. 1 represents a vertical cross-sectional view of a heater incorporating the features of the invention.

Figure 3:
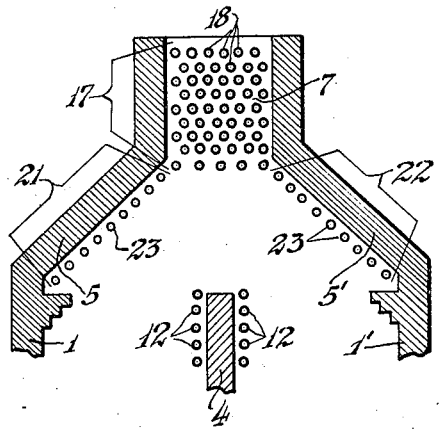

Figs. 2 and 3 each illustrate the upper portion of the same form of heater illustrated in Fig. 1 with modifications of the arrangement of tubular elements in this portion of the heater.

Figs. 4 to 10 illustrate a few of the many various arrangements of flow through the fluid conduit which may be employed in the heaters illustrated in Figs. 1, 2 and 3.

Referring to Fig. 1, the heater here illustrated has refractory side walls indicated by the reference numerals 1 and 1', a refractory floor 2, a foundation 3, and a central refractory wall 4 resting on the foundation and extending vertically upward within the furnace. The central wall 4 extends between the refractory end walls of the heater, which do not appear in the view here illustrated. Portions 5 and 5' of the side walls 1 and 1', respectively, slope inward above the central wall 4 and terminate in substantially vertical walls 6 and 6', respectively, which, together with the end walls, define a fluid heating zone 7. The space between the substantially vertical lower portion of wall 1 and wall 4 comprises combustion and heating zone 8 and the corresponding space between walls 1' and 4 comprises a separate combustion and heating zone 9. That portion of the heater defined by the sloping side walls and the end walls and disposed between the fluid heating zone 7 and the top of wall 4 comprises another separate heating zone 10 through which direct communicating is established between zones 8 and 9 and zone 7.

A tube bank 11 comprising, in the particular case here illustrated, a single substantially vertical row of horizontally disposed tubes 12 is located adjacent the face of wall 4 within combustion and heating zone 8. Another tube bank 13, which in this particular case is substantially identical with bank 11, is located adjacent the opposite face of wall 4 within combustion and heating zone 9.

Another tube bank 15 comprising a plurality of superimposed horizontal rows of horizontally disposed tubes 16 is located within heating zone 10. Bank 15 extends from immediately above the central wall 4 to immediately beneath fluid heating zone 7 and is symmetrical on opposite sides of a vertical plane passing through the center of the heater and each succeeding row from the bottom to the top of this bank has a greater number of tubes than the adjacent lower row, the bank 15 being wedge shaped, as shown.

Another separate tube bank 17 comprising a plurality of horizontal rows of horizontally disposed tubes 18 is located within heating zone 7.

A row of burners 18 disposed beneath the floor 2 of the furnace and adjacent each of the refractory side walls 1 and 1' communicate through firing ports 19 in the floor with the combustion and heating zones 8 and 9. Flames and hot combustion gases issuing from the burners are directed in a substantially continuous sheet against each of the side walls 1 and 1' and travel upwardly thereover to heat the same to a highly radiant condition. Heat is transmitted from the side walls and from the flames and hot combustion gases to the tubular elements of banks 17 and 13 and, by varying the firing conditions in the separate combustion and heating zones, different rates of heating may, when desired, be obtained in the tube banks 11 and 13.

The combustion gases which have given up a substantial portion of their heat to the tubes of banks 11 and 13 commingle in zone 10 and supply heat to the tubes of bank 15. They thence pass through zone 7 wherein they impart heat to the tubes of bank 17 and are thence directed through flue 20 to a suitable stack, not illustrated.

In Fig. 2 the same reference numerals employed in Fig. 1 designate corresponding portions of the heater. However, in Fig. 2 the uppermost row of tubes in bank 15 has been shortened by eliminating the two outermost tubes in this row and two additional tube banks 21 and 22, each comprising a single row of horizontally disposed tubes 23, are provided adjacent the respective sloping walls 5 and 5'.

In Fig. 3 the same reference numerals as employed in Figs. 1 and 2 are also utilized to indicate corresponding portions of the heater. The heater of Fig. 3 is provided with tube banks 21 and 22 like tube banks 21 and 22 of Fig. 2 but tube bank 15 is omitted.

Figs. 4 to 7 inclusive illustrate several specific flows which may be employed in the heater of the form illustrated in Fig. 1.

Figure 4:
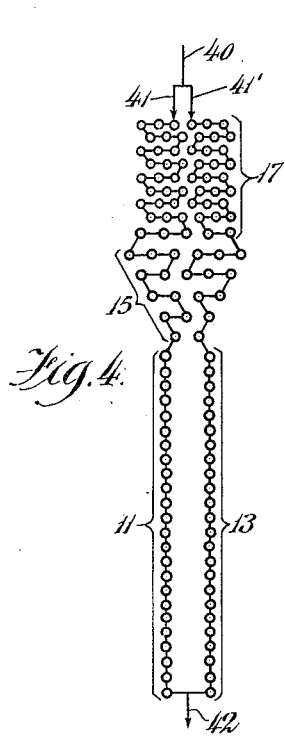

In Fig. 4 the stream 40 of oil or other fluid to be heated is divided into two streams 41 and 41' of substantially equal volume. Stream 41 is passed through the left-hand side of tube banks 17 and 15 in series and thence in series through the tubes of bank 11, while stream 41' is passed through the right-hand side of banks 17 and 15 in series and thence in series through the tubes of bank 13, the two streams being thence united in a single stream 42 which is discharged from the heater. With this arrangement, the separate streams 41 and 41' each pass through the same number of tubes and are each subjected to progressively increasing temperatures. With substantially equal firing on opposite sides of the central wall of the heater, substantially equal heating is accomplished in the two streams and by dividing the total fluid to be heated into two streams, pressure drop through the heating coils is materially reduced.

Figure 5:
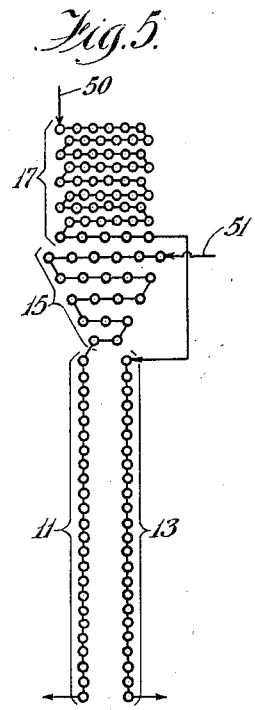

In Fig. 5, one stream 50, comprising, for example, relatively high boiling hydrocarbon oil to be cracked, is supplied to tube bank 17 wherein it flows in series through the adjacent tubes of each row and in series through the adjacent rows from the top to the bottom of this bank. It is thence supplied to tube bank 13 and flows in a series through the adjacent tubes of this bank in a downward direction and is discharged from the lowermost tube thereof. A separate stream 51 of lower boiling hydrocarbon oil to be cracked is supplied to the uppermost row of tube bank 15 and flows downwardly therethrough in series through the adjacent rows of tubes and through the adjacent tubes in each row and thence passes downwardly in series through the tubes of bank 11 to be discharged from the lowermost tube of this bank. With this arrangement more severe firing conditions are preferably employed in the heating zone wherein bank 11 is disposed than those employed in the heating zone wherein bank 13 is disposed, whereby the relatively low-boiling oil is subjected to more severe cracking conditions than the high-boiling oil.

Figure 6:
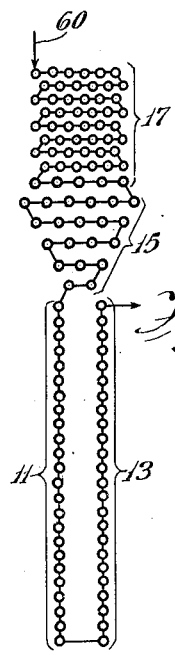

In Fig. 6 a single stream 60 of hydrocarbon oil or other fluid to be heated is passed in series through adjacent tubes in each row and through the adjacent rows of tubes in bank 17 and then in bank 15, the fluid thence passing in series through the adjacent tubes of bank 11 in a downward direction and thence in series through the adjacent tubes of bank 13 in an upward direction and is discharged from the uppermost tube of bank 13 and from the heater. With this arrangement, depending upon the type of fluid undergoing treatment, substantially the same or different firing conditions may be maintained on opposite sides of the central wall of the heater. As applied to the cracking or reforming of light distillates, such as gasoline, naphtha and the like. Tube banks 17, 15 and 11 may serve as preheating and cracking coils wherein the oil attains the maximum temperature employed and bank 13 may serve as a soaking section wherein the oil is maintained at or near the maximum temperature previously attained for a predetermined time by employing milder firing condiitons in the combustion zone wherein tube bank 13 is disposed than in the combustion zone wherein tube bank 11 is disposed.

Figure 7:
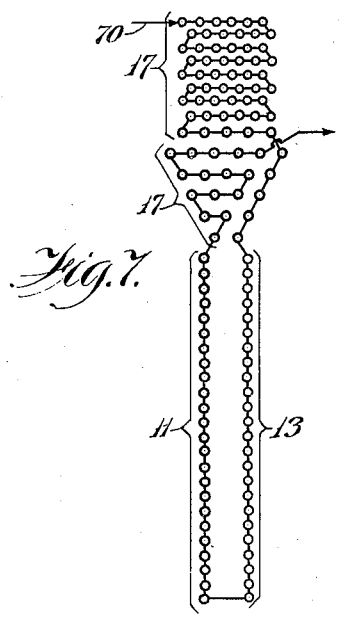

In Fig. 7, a stream 70 of hydrocarbon oil or other fluid to be heated is supplied to tube bank 17 and flows downwardly in series through the adjacent rows of tubes in this bank and in series through the adjacent tubes in each row. It thence passes downwardly in series through the tubes on the right-hand end of each row of bank 17, then downwardly in series through the adjacent tubes of bank 13, thence upwardly in series through the adjacent tubes of bank 11 and finally upwardly in series through the remaining tubes in each row of bank 17, being discharged from the uppermost row of this bank. As applied to the cracking or reforming of relatively light hydrocarbon oil distillates, when milder heating conditions are employed in the heating zone wherein bank 11 is disposed, as compared with those employed in the heating zone wherein bank 13 is disposed, a heating curve similar to that obtainable with the flow shown in Fig. 6 will result, except that somewhat shorter cracking time and longer soaking time is provided with the flow shown in Fig. 7.

Figs. 8 and 9 illustrate two of the many various flows which may be employed in a heater such as shown in Fig. 1, modified to incorporate tube banks 21 and 22 as shown in Fig. 2.

In Fig. 8, two streams 80 and 81 of the same or separate fluids are supplied to the heater. Stream 80 passes through the left-hand side of tube bank 17 flowing downwardly in series through adjacent rows and in series through the adjacent tubes in each row. It thence passes through the left-hand side of bank 15 flowing in a generally downward direction therethrough in series through adjacent tubes and is thence transferred to the uppermost tube of bank 21 and flows downwardly in series through adjacent tubes of this bank and thence downwardly in series through adjacent tubes in bank 11 wherefrom it is discharged. Stream 81 follows a substantially identical course through the right-hand side of bank 17, the right-hand side of bank 15, and through banks 22 and 13.

With substantially the same firing conditions in both combustion and heating zones, the flow shown in Fig. 8 may be employed to heat two substantially equal streams of the same oil under substantially identical conditions, each stream being subjected to progressively more severe heating conditions throughout its course of flow. With different firing conditions in the two combustion and heating zones, the flow shown in Fig. 8 may be employed to heat two dissimilar streams of oil under different conditions, the independent control of the heating conditions in the two streams being obtained in banks 11 and 13 and a considerable independence of control also being obtained in banks 21 and 22.

In Fig. 9, two dissimilar streams 90 and 91 comprising, for example, a stream of heavy hydrocarbon oil and a stream of lighter hydrocarbon oil to be converted, stream 90 being the heavy oil and stream 91 the lighter oil, are supplied to the heater. Stream 90 is passed downwardly in series through adjacent tubes and adjacent rows of tubes on the left-hand side of bank 17, thence downwardly in series through adjacent tubes of bank 21 and finally downwardly in series through the adjacent tubes of bank 11 to be discharged from the lowermost tube of this bank. Stream 91 passes downwardly in series through the adjacent tubes and adjacent rows of tubes on the right-hand side of bank 17 and is thence transferred to the lowermost tube of bank 13 and flows upwardly in series through the adjacent tubes of this bank, thence upwardly in series through the adjacent tubes of bank 22 and finally passes downwardly in series through adjacent rows of tubes and in series through adjacent tubes of each row in bank 15 to be discharged from the lowermost row of tubes of this bank.

With the arrangement shown in Fig. 9 more severe firing conditions are preferably employed in the heating zone wherein bank 13 is disposed than in the heating zone wherein bank 11 is disposed. The heavy oil stream is subjected to progressively more severe heating conditions throughout its path of flow through the heating coil, while the light oil stream is preheated in the right-hand side of bank 17, reaches its maximum cracking temperature as it flows through banks 13 and 22 and is given a relatively short soaking time in bank 15.

Fig. 10 illustrates one of the many specific flows which may be employed in the heater shown in Fig. 1, modified to include banks 21 and 22 of Fig. 2 and omit bank 15. In Fig. 10 a stream 100 of oil or other fluid to be heated is supplied to and passes downwardly in series through adjacent rows of tubes and in series through adjacent tubes in each row on the left-hand side of bank 17, thence downwardly in series through adjacent tubes of bank 21 and finally downwardly in series through adjacent tubes of bank 11, to be discharged from the lowermost tube of this bank. A separate stream 101 of the same or dissimilar fluid is supplied to the right-hand side of bank 17 and flows downwardly in series through the tubes of this portion of the bank and through the tubes of bank 22 and finally through the tubes of bank 13 to be discharged from the lowermost tube of the latter bank.

As applied to the cracking of two substantially equal streams of the same oil with the flow shown in Fig. 10, substantially equal firing conditions are maintained in the two combustion and heating zones of the heater and each stream is subjected to substantially the same heating conditions and to progressively more severe heating conditions throughout its course of flow. As applied to the cracking of two separate streams of different oils with the flow shown in Fig. 10, different firing conditions are preferably maintained in the two combustion and heating zones, independent control of the heating conditions to which the separate streams are subjected being obtained in banks 11 and 13 and to a considerable degree in banks 21 and 22.

It will, of course, be understood that the flows shown illustrate only a few of the many possible variations which are within the scope of the invention and which may be readily devised by one familiar with the art. They are intended to merely illustrate the flexibility of the improved form of heater provided by the invention.

I claim as my invention:

1. A furnace for heating fluids comprising, in combination, side and end walls defining the lower portion of the furnace, a central wall dividing said lower portion of the furnace into separate combustion zones, fluid conduits disposed adjacent the opposite sides of said central wall, a fluid heating zone communicating with said combustion zones, means for supplying combustible mixtures of fuel and air upwardly into said combustion zones at an angle against the inner faces of said side walls, means for transmitting radiant heat from said side walls directly to said central wall and to one side of each of said fluid conduits disposed adjacent the central wall, means for supplying reflected radiant heat from said central wall to the opposite side of said fluid conduits disposed adjacent the same, means for passing combustion gases from each of said combustion zones to said fluid heating zone, heating tubes disposed immediately beneath said fluid heating zone and above said central wall and connected in series with at least one of said fluid conduits, and means for passing said combustion gases over the last mentioned heating tubes.

2. A furnace for the heating of fluids comprising, in combination, side and end walls defining the lower portion of the furnace, a vertical wall extending between said end walls and disposed centrally in relation to said side walls, fluid conduits disposed adjacent opposite sides of said central wall, a floor containing firing ports disposed adjacent said side walls, burners communicating with said firing ports, said burners and firing ports being so disposed as to direct combustible fuel mixtures at an angle against and over the inner faces of said side walls in a general upward direction, a fluid heating zone of smaller cross-sectional area than said lower portion of the furnace and communicating with said combustion zones, said fluid heating zones being located above said central wall, spaced therefrom and disposed centrally in relation to the lower portion of the furnace, sloping walls disposed above the side walls of said lower portion of the furnace and connecting the latter with the side walls of said fluid heating zone, heating tubes in said fluid heating zone, and additional heating tubes disposed immediately beneath said fluid heating zone and above said central wall and connected in series with at least one of said fluid conduits.

WALTER C. HENSEL.